United States Patent [19]

Chen et al.

[11] Patent Number: 5,304,849
[45] Date of Patent: Apr. 19, 1994

[54] METHOD AND APPARATUS FOR AUTOMOBILE SECURITY SYSTEM

[76] Inventors: Haw-Renn Chen; Feichu H. Chen, both of 4057 Little Hollow Pl., Moorpark, Calif. 93021

[21] Appl. No.: 943,122

[22] Filed: Sep. 8, 1992

Related U.S. Application Data

[63] Continuation of Ser. No. 765,502, Sep. 26, 1991, abandoned, which is a continuation of Ser. No. 363,859, Jun. 9, 1989, abandoned.

[51] Int. Cl.$^5$ .............................................. B60R 25/04
[52] U.S. Cl. ................................... 307/10.5; 307/10.2
[58] Field of Search ............... 340/426; 307/9.1, 10.1, 307/10.2, 10.3, 10.4, 10.5

[56] References Cited

U.S. PATENT DOCUMENTS

| | | | |
|---|---|---|---|
| 3,646,515 | 2/1972 | Vodehnal | 307/10.3 |
| 4,413,261 | 11/1983 | Greenberg | 307/10.3 |
| 4,438,752 | 3/1984 | Cheung | 123/630 |
| 4,636,651 | 1/1987 | Kilgore | 307/10.3 |
| 4,682,062 | 7/1987 | Weinberger | 307/10.4 |
| 4,736,113 | 4/1988 | Leu | 307/10.5 |
| 4,749,873 | 6/1988 | Mutoh et al. | 307/10.1 |
| 4,804,856 | 2/1989 | Hanisko et al. | 307/10.1 |
| 4,809,199 | 2/1989 | Burgess et al. | 361/171 |

*Primary Examiner*—Jeffrey A. Gaffin

[57] ABSTRACT

A security system for an automobile starter system is an electrical installation on the automobile whereby the starter system of the automobile can be actuated only when a correct ignition key to the automobile is used. Also, the starter system is safeguarded from being mistakenly actuated as the automobile motor is running. Two types of electrical circuit configuration are proposed to perform the automobile starter system security functions. The first electrical circuit configuration utilizes the analog circuitries applied with voltage window detection concept. The other electrical circuit configuration utilizes the sequential digital circuitries applied with the signal code detection concept.

13 Claims, 4 Drawing Sheets

METHOD AND APPARATUS FOR AUTOMOBILE SECURITY SYSTEM

This application is a continuation of U.S. appliction Ser. No. 07/765,502, filed Sep. 26, 1991, now abandoned which is continuation of U.S. application Ser. No. 07/363,859, filed Jun. 9, 1989, now abandoned.

BACKGROUND OF THE INVENTION

An automobile engine starter system typically comprises a battery, a starter motor, a starter magnetic relay, and a starter switch (the 'START' position on the ignition switch). On some automobile, a starter solenoid mounted on the starter case is used for gearing the starter motor to the fly-wheel through the drive pinion. Starter motor coil windings are connected to the positive polarity post of the battery through the starter magnetic relay which, when closed, directs current from the battery positive polarity to the starter motor coil windings causing the motor rotor to rotate. The starter magnetic relay is controlled by an actuating electrical-loop which connects the positive polarity of the battery to the ground through the starter switch.

While starting an automobile motor, an ignition key needs to be placed in the ignition switch and turned to the position 'START' on the ignition switch. At this position, the starter switch will be closed such that the actuating electrical-loop controlling the starter magnetic relay starts to conduct current and actuates the starter magnetic relay to close. Once the starter magnetic relay is closed, the current is directed to the starter motor coil windings and the motor rotor begins to turn. Simultaneously, by the positive engagement mechanism or the solenoid mounted on the starter case, the starter pinion drive is pushed out to engage the fly-wheel.

After the automobile motor starts running, the ignition key is released to the position 'ON' on the ignition switch. The starter switch is then opened and so is the starter magnetic relay. After the starter magnetic relay is opened, current directed to the starter motor coil windings is cut off and, then, the starter motor rotor stops running.

Since the ignition switch is installed on the steering wheel shaft at the location nearby the dashboard in the passenger chamber of the automobile, several electrical wires will be wired from the engine compartment to the ignition switch including the ignition wires connected to the starter switch. This configuration of the motor starter system is vulnerable to the automobile theft due to its easiness to have the automobile motor started simply by shorting the positive potential ignition wire to the ground wire to direct current to actuate the starter magnetic relay. To drastically reduce the possibility of the automobile theft, hence, is one of the major concerns of the present invention.

SUMMARY OF THE INVENTION

This invention is directed to an automobile starter system with special security feature which ensures that, without the use of the correct ignition key, the starter system can't be started just by shorting ignition wires together such that the probability of automobile theft can be dramatically reduced. In accordance with the present invention, two types of electrical security circuitries are proposed in which the first type of circuitry uses the concept of the voltage window detection while the second type of circuitry applies the concept of sequential signal code detection.

To apply the voltage window detection concept in the automobile starter security system, a voltage generation means is installed nearby where the ignition switch is to generate a predetermined voltage level while a voltage window detection. circuitry is installed nearby the starter system to detect if the incoming signal has a voltage level within the predetermined voltage window. Therefore, when the ignition key is turned to the 'START' position, a voltage generated by the voltage generation means is sent to the voltage window detection circuitry and a voltage level will be sent from the output of the voltage window detection circuitry to actuate the automobile starter system if the voltage level coming to the voltage window detection circuitry is within the predetermined voltage window. Hence, an automobile theft, without knowing the predetermined voltage window for an automobile, can't start the starter system and the automobile motor just by shorting wires togather. This is a very economical security provision.

The concept of sequential signal code is applied to the automobile starter system with a DC-signal/sequential-code conversion means and a sequential signal code detection means. The DC-signal/sequential-code conversion means is preferably placed nearby the ignition switch on the steering wheel. The input of the DC-signal/sequential-code conversion means is connected to the node 'START' of the ignition switch. Once the ignition key is turned to the position 'START', the input of the DC-signal/sequential-code conversion means is connected to a voltage 'High' and, through a circuitry comprising a self-clock-pulses generation means, a train of time-domain sequential security code is generated.

The time-domain sequential security code is then transmitted from the DC-signal/sequential-code conversion means, installed nearby the steering wheel, to the sequential signal code detection means, installed nearby the starter system located in the engine compartment. When the incoming sequential signal code meets the predetermined code, a desired electrical signal will be generated at the output of the sequential signal code detection means and sent to actuate the starter system. A set of switches can be provided in the DC-signal/sequential-code conversion means as well as the sequential signal code detection means for the convenience of setting any private code.

Also, an automobile enable/disable means, which comprises logic gate means and an automobile-motor-monitoring circuit means, can be added to the automobile starter security system. The automobile-motor-monitoring circuit means has one of its inputs connected to the transducer-signal generation means of the automobile such that the automobile security system can be prevented from being engaged into a running automobile motor.

Hence, the first object of the present invention is to provide a new concept of automobile security system not only economically but also effectively by preventing the automobile starter system from being anaminously started by an automobile theft. The second object of the present invention is to provide a means to prevent an automobile starter system from being engaged into a running automobile motor.

DETAIL DESCRIPTION OF THE EMBODIMENT

Figure 1:
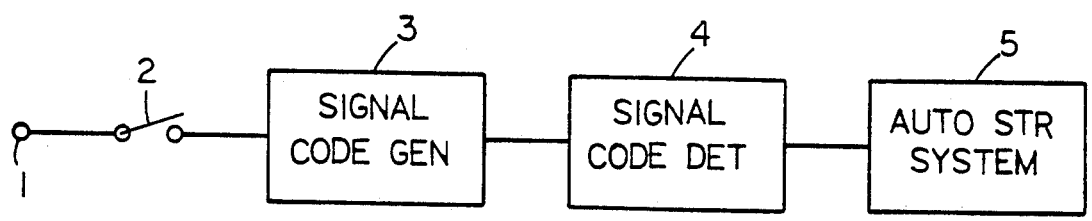
FIG. 1 shows the configuration of the electrical security system for an automobile starter system.

An electrical security system for an automobile starter system, as shown in FIG. 1, comprises an electrical signal code generation means 3, an electrical signal code detection means 4, and an automobile starter system 5. The electrical signal code generation means 3 is preferably installed nearby the ignition switch or made to be an unity with the ignition switch such that the electrical signal code generation means 33 will not be functional if the ignition switch is damaged. The electrical signal code detection means 4 is preferably installed at an appropriate location in the engine compartment. The input as indicated by 1 is normally connected to the positive polarity of the automobile battery. When the ignition switch is turned to the position 'START' on the ignition switch, the electron current valve as indicated by 2 in FIG. 1 is closed such that a voltage high signal from the input 1 is sent to the input of the signal code generation means. After the signal from the input 1 transmits to the signal code generation means, a predetermined signal code is generated in the form of voltage, electrical current, electromagnetic signal, accoustic wave, or optical signal and transmitted to the signal code detection means. If the signal code received by the electrical signal code detection means matches a predetermined format or level, the electrical signal code detection means will send out a signal to actuate the starter system and the automobile motor thereof.

The electrical signal code detection means can include an electrical enable/disable means which has one of its inputs directly or indirectly connected to a transducer signal generation means, which generates a signal as an indicator of the automobile motor speed, so that a signal from the transducer signal generation means is transmitted to the electrical enable/disable means to disable the electrical signal code detection means from actuating the automobile starter system under any circumstance. The transducer signal generation means is typically part of a special automobile signal generator, generally called tachometer. The aforementioned setup is generally used to prevent the automobile starter system from being accidentally engaged into a running automobile motor.

Figure 2:
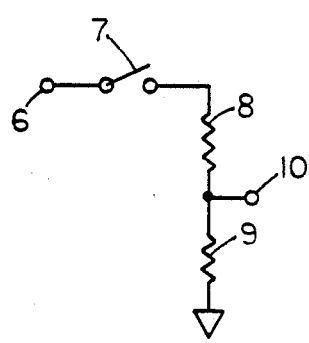
FIG. 2 shows the circuit configuration of a voltage dividing means.
Figure 3:
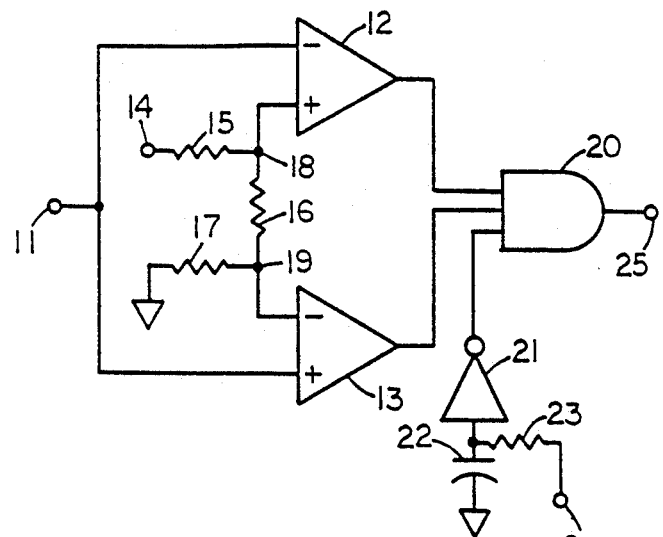
FIG. 3 shows the circuit configuration of a voltage-window detection means.

The first proposed electrical security system for an automobile starter system uses the analog signal amplitude window detection concept which includes an analog signal generation means, as shown in FIG. 2, and an analog signal amplitude detection means as shown in FIG. 3.

The analog signal generation means comprises two electrical resistive components as indicated by 8 and 9 respectively in FIG. 2. The analog signal amplitude detection means comprises an electrical comparing means, a reference voltage generation means, and a logic function means. As illustrated in FIG. 3, two differential-input line receivers 12 and 13 are used as the electrical comparing means, three electrical resistive components 15, 16, and 17 are used as the reference voltage generation means, and a plural-inputs AND gate 20 is used as the logic function means. Circuitry with low pass filtering capability can be imbedded in the input terminals of the differential-input line receivers 12 and 13 to prevent noise from engaging into the voltage window detection means.

An electron current valve as indicated by 7 in FIG. 2 is connected to the input of the analog signal generation means such that, when the ignition key is turned to the position 'START', the electron current valve 7 is closed and, through 7, the input of the analog signal generation means is connected to a power supply V0 as indicated by 6 in FIG. 2, preferably the automobile battery. The analog signal generation means is installed at an appropriate location in the passenger chamber whereof, when 7 is closed, a voltage V1 determined by the value of V0 and the ratio of the values of 8 and 9 is generated at the output as indicated by numeral 10 and is sent to the input, 11, of the analog signal amplitude detection means located in the engine compartment. Two reference voltages V2 and V3 for the '+' and '−' inputs of the line receivers 12 and 13 respectively are generated at nodes 18 and 19 respectively by having the voltage supply at 14 divided by 15, 16, and 17. The line receivers 12 and 13 will both have output high only when V1 at 10 is falling in between V2 at 18 and V3 at 19, that is V1 is higher than V3 but lower than V2. As V1 is higher than V2 or lower than V3, either 12 or 13 will have output low. Since the outputs of 12 and 13 are connected to the inputs of 20 which will have output high only when both 12 and 13 have output high, V2 and V3 define the upper limit and lower limit of the voltage window wherewithin a voltage level V1 can enable the output of 20 which is indicated by 25. The enabled output 25 is then transmitted to actuate the automobile starter system. Consequently, the foregoing proposed automobile starter system security system is used to guarantee that the automobile starter system can be started only when the voltage level, which is generated by turning the ignition key to the switch position 'START', sent to the voltage signal amplitude detection means falls within the predetermined voltage window and, therefore, enforces the use of the ignition key and reduces the car theft possibility.

If the AND gate 20 is selected to have more than two inputs, one of these inputs can be connected to the output 24 of the tachometer of the automobile through an appropriate automobile-motor-monitoring circuit means. The automobile-motor-monitoring circuit means can be set up to comprise an active electrical component 21 and two passive electrical components 22 and 23 as illustrated in FIG. 3 in the way that the output of 20 will be disabled as long as a signal from the output 24 of the tachometer is logic high. The input of 21, which is from 24, will have logic low level as long as the automobile motor is not running such that the output of 21 will be high and the output signals from 12 and 13 are allowed to pass through 20 to actuate the starter system. Once the automobile motor is running at a rotational speed higher than the pre-calibrated value, the input of 21 will become logic high after 22 is charged up by 24 through 23 and the output of 21 is switched to logic low thereafter. The logic low output of 21 is thereof transmitted to one of the inputs of 20 to disable the output of 20, i.e. to keep the output of 20 logic low thereafter. Consequently, the automobile starter system is shut off with a predetermined time delay (determined by the time constant of RC, where R is the resistive value of 23 and C is the capacitive value of 22) after the automobile motor is running at a speed reasonable above the pre-calibrated value. An optimum value is selected for the time constant RC to ensure that the automobile starter system will be engaged to the automobile motor long enough so that the automobile motor will keep running after the automobile starter system is disengaged from the automobile motor. The combination of the automobile-motor-monitoring circuit means and the logic gate means 20 forms the electrical enable/disable means as mentioned earlier. The inclusion of the electrical enable/disable means can not only be used to shut off the automobile starter system after the automobile motor starts to run steadily but also can be used to prevent the automobile starter system from being accidentally engaged into a running automobile motor.

Figure 4:
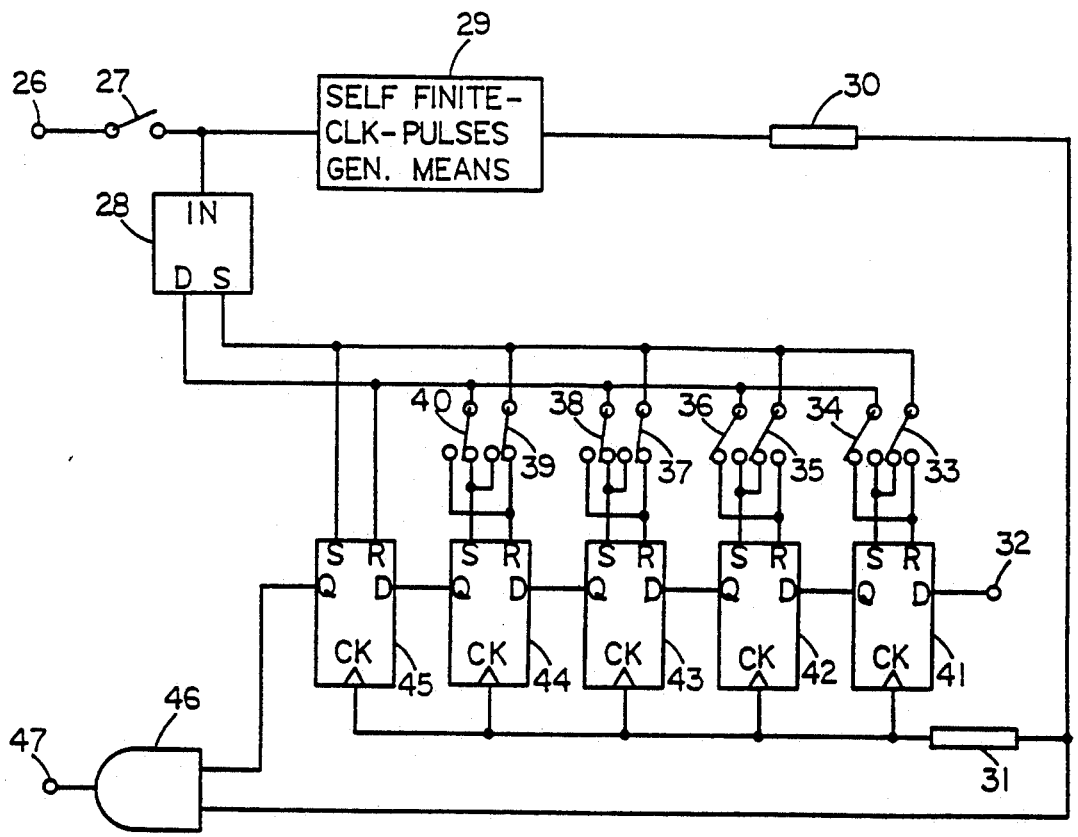
FIG. 4 illustrates the configuration of a DC-signal/sequential-code conversion means.
Figure 7:
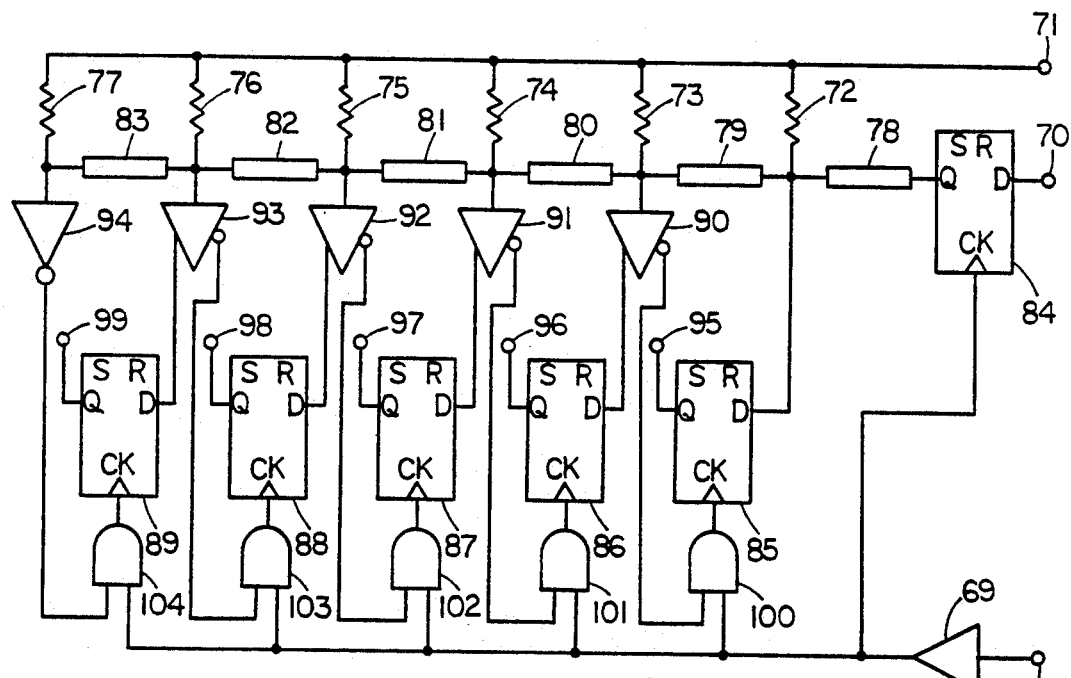
FIG. 7 shows a signal code detection means for detecting a five-cell-data sequential code.

The next proposed electrical security system for an automobile starter system uses the concept of sequential signal code detection which includes a DC-signal/sequential-code conversion means, as illustrated in FIG. 4, and a signal code detection means, as illustrated in FIG. 7. The DC-signal/sequential-code conversion means, which is preferably installed in the passenger chamber nearby the ignition switch or made to be an unity with the ignition switch such that the DC-signal/sequential-code conversion means will not be functional if the ignition switch is damaged, comprises a state initialization means, a self finite-clock-pulses generation means, and a signal code generation means. The signal code detection means, which is preferably installed close to the starter system of the automobile, comprises a state initialization means, a number of latch-type means, signal time-delay means, and some other electrical logic means.

Figures 5, 6:
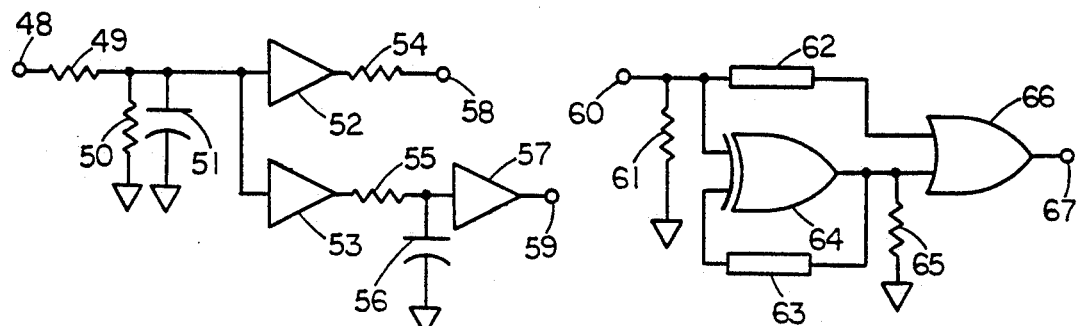
FIG. 5 shows a two-input state initialization means.
FIG. 6 shows a self finite-clock-pulses generation means configured with an XOR gate.
Figure 8:
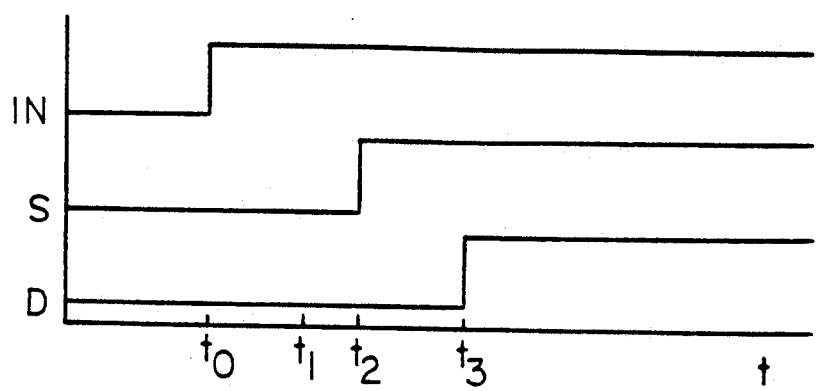
FIG. 8 shows a timing relation of the 'IN'-input port, D-output port, and S-output port of a two-input state initialization means.

The state initialization means, which comprises a plural-output buffer having at least one output port followed by a signal time-delay means, as indicated by 28 in FIG. 4 typically has an input port and plural output ports, as illustrated in FIG. 5 for a two-output port state initialization means with outputs S, 58, and D, 59. As shown in FIG. 5, the input port of the state initialization means is indicated by 48 which is followed by a voltage divider comprising 49 and 50. 51 is used as a voltage protection capacitor to suppress any voltage surge incoming from input port 48. When the incoming signal from 48 changes state, the output ports S and D will change states with different propagation delays, as illustrated in FIG. 8 for the case of changing state from logic low to logic high. FIG. 8 shows that the input port 48 changes state from logic low to logic high at time t0 such that at time t1 the input threshold voltage of the buffer means, as indicated by 52 and 53, is reached. Hence, at time t2, which is a gate propagation delay behind t1, the outputs of 52 and 53 are both pulled high. The output high of 52 is transmitted immediately to the S output 58 while the output high of 53 is transmitted to the D output 59 at time t3, which is behind t2 by the time interval determined by the time constant of RICI, where R1 is the resistive value of 55 and C1 is the capacitive value of 56, and the propagation delay of the buffer means 57.

The self finite-clock-pulses generation means, as indicated by 29 in FIG. 4, for generating a finite number of clock pulses comprises a self clock-pulses generation means, which is used for generating a continuous free-running clock pulses, and a clock-pulses blocking means, which is used for adjusting the number of the clock pulses out of the self finite-clock-pulses generation means. The self clock-pulses generation means comprises an electrical logic-state-transfer means and an electrical signal time-delay means. The electrical logic-state-transfer means can be configured with an XOR function or NAND function etc. to convert a DC high signal into clock pulses, a NOR function etc. to convert a DC low signal into clock pulses, or other circuit types to convert a DC low and/or DC high into clock pulses. A self clock-pulses generation means for converting a DC high signal into clock pulses is configured with an XOR gate 64 and an electrical signal time-delay means, 63, as shown in FIG. 6. The electrical logic-state transfer means 64 has plural inputs wherein one of the inputs is connected to a DC signal input, 60, while another input is connected to the output of the electrical logic-state-transfer means through the signal time-delay means (STDM) as indicated by 63 in FIG. 6. The STDM 63 is tuned to have a signal delay time of T1. The output of the self clock-pulses generation means, which converts a DC-signal into a train of clock pulses, is then directed to one of the inputs of the clock-pulses blocking means, which comprises, as illustrated in FIG. 6, an STDM 62, the resistive components 61 and 65, and an OR gate 66. The clock-pulses blocking means is part of the self finite-clock-pulses generation means and is used to adjust the number of the clock pulses at output 67 by tuning the signal delay time T2 of the STDM 62.

Figure 9:
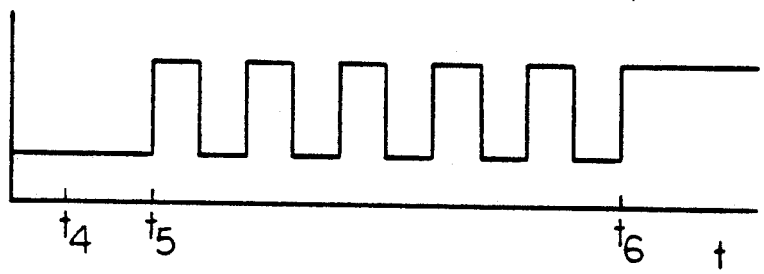
FIG. 9 shows the output waveform of a self finite-clock-pulses generation means.

In the self finite-clock-pulses generation means for converting a DC high signal into finite string of clock pulses as illustrated in FIG. 6, 61 and 65 are used as termination resistors to discharge any floating residue charges. As the input port 60 changes logic state to high, the input of the STDM 62, which is tuned to have signal delay time of T2, and one of the inputs of 64 are pulled high immediately. Since the other input of 64 is initially low due to the termination resistor 65, the output of 64 is switched to high after the input connected to 60 is switched to logic high. The output high of 64 will then go through the STDM 63 and reach the other input to have the output change logic state to low. This output low of 64 will, then, propagate to the other input through the STDM 63, after same propagation delay as mentioned above, to change the state of the output. If the total propagation delay through the STDM 63 and XOR gate 64 is P and P is much shorter than T2, the output of 66 will be toggling with the period of 2P until the voltage high signal transmitting through the STDM 62 reaches one of the inputs of 66. The output of 66, thereof, will be pulled up by the logic high input and will stay high thereafter, although the output of the self clock-pulses generation means is still toggling between logic high and logic low with period of 2P. Therefore, the function of this self finite-clock-pulses generation means is to generate predetermined number of clock pulses after the input port 60 changes logic state from low to high at time t4 as illustrated in FIG. 9 for a five clock pulses. As can be seen in FIG. 9, the output of the self finite-clock-pulses generation means, containing five full clock pulses with period of 2P, begins at t5, and after time t6 the output of the self finite-clock-pulses generation means will stay high thereafter.

The signal code generation means comprises latch-type means and a signal code setting means. A data type converting means can be added to the output side of the signal code generation means to convert the output data to any desired form. To have the operation of the signal code generation means and the signal code detection means illustrated clearly, a sequential signal code of '1001' is selected as an illustration example in the context here. An additional 'Start Bit', which is preferably always set to '1', can be added to the beginning of the sequential signal code and an additional 'Stop Bit', which is preferably always set to '1', can be added to the end of the sequential signal code in which both 'Start Bit' and 'Stop Bit' make the whole sequential signal code string be '110011'. Since the whole sequential signal code of '110011' contains four data cells (four bits), excluding the 'Start Bit' and the 'Stop Bit', five D-type flip-flops (DFF's), 41 through 45 as illustrated in FIG. 4, are used as the latch-type means of the signal code generation means while four double-pole-double-throw (DPDT) switches, which contain eight electron current valves 33 through 40, are used as the signal code setting means. The number of the DFF's generally equals the number of the data cells in the sequential signal code plus one for the 'Start Bit' for the particular example in the context in which a 'Start Bit' and a 'Stop Bit' are added to the signal code. The DFF's as illustrated in FIG. 4 are installed in series where the clock input, CK, of each DFF is connected to the self finite-clock-pulses generation mean through the STDM 30 and the STDM 31. The S (Set) and R (Reset) inputs of the DFF's 41 through 44 are connected to the output D or output S of the state initialization means individually through the electron current valves 33 through 40, while the S input and R input of the DFF 45 are directly connected to the output S and output D of the state initialization means respectively. Also, the Q output of each DFF is connected to the D input of the subsequent DFF except that the D input of the first DFF, 41, is tied to a logic high, 32. The Q output of the DFF 45 is used as the output of the signal code generation means. The logic high at 32, which is the input of 41, is going to be clocked out of the Q output of the DFF 45 at the last clock transition as the 'Stop Bit' mentioned earlier.

Figure 10:
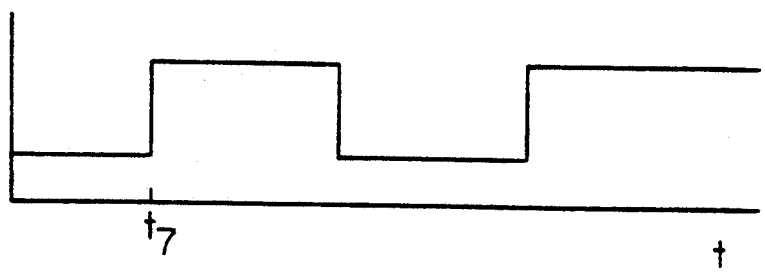
FIG. 10 shows the NRZ-output waveform from the signal code generation means.

The sequential signal code generated by the signal code generation means is determined by how the D output and the S output of the state initialization means are connected to the R or S inputs of the DFF's, 41 through 45, through the electron current valves, 33 through 40. After the switch 27 is closed at time t0 as shown in FIG. 8, which occurs when the ignition switch of the automobile is turned to the position 'START', the S and D outputs of the state initialization means have the output transitions as shown in FIG. 8 in which, during the time duration between t2 and t3, S has output high while D has output low. Thus, the Q outputs of the DFF's, such as DFF's 41, 44, and 45, with S input connected to the S output of the state initialization means are set to '1' while the Q outputs of the DFF's, such as DFF's 42 and 43, with R input connected to the S output of the state initialization means are reset to '0'. The outputs S and D of the state initialization means will both have logic high state after t3 such that all the DFF's will have both S and R inputs high which enables the Q-output of a DFF to follow the D input when triggered by the clock edge. The output of the signal code generation means is determined by the configuration of the signal code setting means as illustrated in FIG. 10 for the '110011' signal code at the output of the signal code generation means. As a consequence of the chosen sequential signal code, the S inputs of the DFF's 41, 44, and 45 are connected to the S output of the state initialization means to set their Q outputs high while the R inputs of the DFF's 42 and 43 are connected to the S output of the state initialization means to reset their Q outputs low during t2 and t3. If the propagation delay from the S or R input to the Q output of a DFF is tpd1, the Q outputs of the DFF's 45 through 41 will be in the sequence of '110011' at the time (t2+tpd1) which is designated as t7 in FIG. 10.

The clock pulses string from the self finite-clock-pulses generation means 29 are going to the CK inputs of the DFF's through the STDM 30 and STDM 31, which are preferably tuned to ensure that the 'Start Bit' of the signal code string has the time period of 2P. The positive clock phase transition shifts the sequential signal code data cells from the DFF 41 towards the DFF 45 such that the phases of the Q output of the DFF 45 as a function of time are shown in FIG. 10 in which the Q output of the DFF 45 has a data string with non-return-to-zero (NRZ) format. Since the clock pulses string from the self finite-clock-pulses generation means has period of 2P, the NRZ data cells string from the DFF 45 has period of 2P as well.

Figure 11:
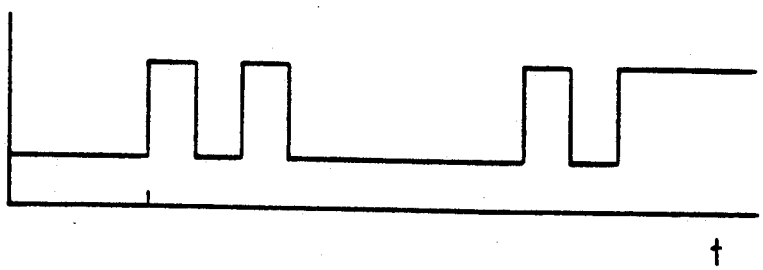
FIG. 11 shows the RZ-output waveform from the signal code formatting means.

The signal code formatting means is generally used to format the output signal from the signal code generation means into any desired form, as illustrated in FIG. 4 for a logic gate 46 to translate the NRZ signal format, which is from the signal code generation means, into a return-to-zero (RZ) signal format. As shown in FIG. 4, one of the inputs of 46 is connected to the Q output of the DFF 45 while the other input is connected to the output of the STDM 30. The RZ output signal from the signal code formatting means 46 is illustrated in FIG. 11. In order to achieve a 50% duty cycle of RZ data cells out of the output of 46, the STDM 30 needs to be tuned so that the positive clock phase transition of the other input of 46 is behind the beginning of the NRZ data cells by the amount of time which is greater than zero but less than P. As a result, the sequential signal code generation means associated with the signal code formatting means as shown in FIG. 4 generates a finite string of RZ data cells with 50% clock duty cycle. These RZ data cells are transmitted to the sequential signal code detection means, as shown in FIG. 7, preferably located in the engine compartment.

As mentioned previously, a sequential signal code detection (SSCD) means comprises a state initialization means, a number of latch-type means, signal time-delay means, and some electrical logic means, as illustrated in FIG. 7 for a four-data-cell signal code detection means with D-type Flip-Flop's as the latch-type means. The state initialization means, as depicted in FIG. 5, is the same as that used in the DC-signal/sequential-code conversion means. The outputs S and D of the state initialization means are directly connected to the input S and the input R of each DFF respectively and are used to reset the initial states of the outputs Q of the DFF's to '0'. Six DFF's, DFF's 84 through 89, are installed in the SSCD means. These DFF's, associating with the signal time-delay means, STDM's 78 through 83, can decode the incoming sequential signal code. The output of each STDM is initialized to 'Low' through the termination resistors, 72 through 77, which are connected to a logic low input 71.

The sequential signal code data string from the DC-signal/sequential-code conversion means to the input 68 of the SSCD means will transmit through the buffer means 69 and arrive at the CK-inputs of the DFF 84 directly and the DFF's 85 through 89 through ANDing logic gates, 100 through 104, after the Q-outputs of the DFF's have been reset to '0'. A buffer means 69 is used to reinforce the sequential signal code data string signal which has travelled a long way from the passenger chamber to the engine compartment of the automobile. The sequential signal code data string is transmitted to the CK-inputs of the DFF's acting as clock triggers. As can be seen in FIG. 7, the D-input of the DFF 84 is tied to 70, a logic high port, such that, after the first positive clock phase transition (Start Bit) to the CK input, the Q output of the DFF 84 is switched from low to high. The Q output high of the DFF 84 is transmitted to the D-input of the DFF 85 through the STDM 78, to the D-input of the DFF 86 through the STDM 79 and the differential-outputs buffer means (DOBM) 90, to the D-input of the DFF 87 through STDM 80 and DOBM 91, to the D-input of the DFF 88 through the STDM 81 and the DOBM 92, to the D-input of the DFF 89 through STDM 82 and the DOBM 93.

Let the propagation delay of each of the ANDing logic gates (100 through 104) be tpd2, the propagation delay of each of the differential-outputs buffer means (90 through 94) be tpd3, the setup time from the D-input to the Q-output in each of the DFF's (84 through 89) be tsu1, the propagation delay from the D-input to the Q-output in each of the DFF's be tpd4. Proper tuning on the STDM's 78 through 83 is critical to achieve correct signal code detection. The STDM's are to be tuned such that the logic high Q-output signal from the DFF 84 can transmit consecutively through the STDM's to reach the D-input of each of the DFF's at least a set-up time margin, tsu1, before the corresponding positive clock phase transition of the sequential signal code data train occurs. There are various ways to tune the STDM's. A somewhat optimal arrangement is selected as an illustration wherein the STDM 78 is tuned to have signal delay time less than for equal to (2P+tpd2−tsu1−tpd4) while the STDM's 79 through 83 are tuned to have the signal delay time of (2P−tpd3).

Let the time that the rising edge of the 'Start Bit' clock pulse of the signal code reaches the output of 69 in the SSCD means be t8, then the n-th data cell will reach the output of 69 at time (t8+2nP) where 2P is the clock-pulses period of the signal code. Since, as mentioned above, a signal code of '110011' was chosen as an illustration, where the first bit is the 'Start Bit' and the last bit is the 'Stop Bit', the positive clock phase transitions (rising edges) of the signal code at the output of 69 occur at t8, t8+2P, t8+8P, and t8+10P. Before the signal code reaching the signal code detection means, only the D-input of the DFF 84 is at logic high while the D-inputs of the DFF's 85 through 89 stay at logic low since the output sides of STDM's 78 through 83 are initially pulled low by the termination resistors 72 through 77. Also, one of the inputs of each of 100 through 104 is at logic high due to the inversion of the logic low signal at the output sides of STDM's 78 through 83 by 90 through 94. As a result of the 'Start Bit', the Q-output of the DFF 84 changes state from logic low to logic high at (t8+tpd4) due to its logic high D-input while the Q-outputs of the DFF's 85 through 89 stay low due to their logic low D-inputs. The Q-output of 84 will stay high thereafter such that any later clock rising edges won't affect the Q-output of 84. The logic high Q-output signal from the DFF 84 is then transmitted into the STDM 78. Since the signal delay time of the STDM 78 is less than or equal to (2P+tpd2−tsu1−tpd4), the logic high Q-output signal from the DFF 84 arrives at the D-input of the DFF 85 earlier than or at time (t8+2P+tpd2−tsu1). Due to the fact that one of the inputs of each of the ANDing logic gates 100 through 104, which is connected to the inversion output of each of the DOBM's 90 through 94 respectively, stays high, the rising edge of the first signal code data cell, which is following the 'Start Bit', arriving at the other input of each of the ANDing logic gates 100 through 104 at time (t8+2P), can propagate through the ANDing logic gates to the CK-inputs of the DFF's 85 through 89 at time (t8+2P+tpd2). At time (t8+2P+tpd2), the D-input of the DFF 85 has been a logic high since the time earlier than or at (t8+2P+tpd2−tsu1), which is a setup time tsu1 before (t8+2P+tpd2), while the D-inputs of the DFF's 86 through 89 are still low. As a result, a state transition from logic low to high occurs only at 95, which is the Q-output of the DFF 85, after the rising edge of the first signal-code data cell.

As time ellapes, the logic high Q-output signal from the DFF 84 goes through the STDM 79 and the DOBM 90 to arrive at the D-input of the DFF 86 at time (t8+4P+tpd2−tsu1) while the inversion of the Q-output signal from the DFF 84, a logic low signal inverted by 90, goes to one of the inputs of the ANDing logic gate 100 at time (t8+4P+tpd2−tsu1), in which tpd2 is assumed to be greater than tsu1, such that the clock pulses later than (t8+4P) are blocked from going through 100 to the CK-input of the DFF 85 to keep the state of 95 intact from then on. Since the second signal-code data cell is '0', there is no activity taking place at the DFF 86, and hence 96, the output of the DFF 86, stays at logic low thereafter due to lack of clock pulse to trigger the CK-input, regardless a logic high signal at the D-input of the DFF 86. The logic high Q-output signal from the DFF 84 continues proceeding through the STDM 80 and the DOBM 91 to the D-input of the DFF 87 at time earlier than or at (t8+6P+tpd2−tsu1) and also, at the same time, the inverted output of 91 goes to one of the inputs of 101 such that the clock pulses later than (t8+6P) are blocked from going through 101 to the CK-input of the DFF 86 to ensure that the logic state of 96 won't be erroneously changed from low to high by the later clock pulses. The third signal-code data cell is also '0' such that 97, the Q-output of the DFF 87, stays low thereafter due to lack of clock pulse to trigger the CK-input during the time duration from (t8+6P) to (t8+8P), as the case of 96.

The logic high Q-output signal from the DFF 84 further goes through the STDM 81 and the DOBM 92 reaching the D-input of the DFF 88 at time earlier than or at (t8+8P+tpd2−tsu1), while the inverted signal low from the inversion output of 92 reaches one of the inputs of 102 at the same time. A clock pulse from the fourth data cell '1' arrives at the other inputs of 100 through 104 at time (t8+8P). Because 100 through 102 are blocked by the logic low signal at one of their inputs, the clock pulse at (t8+8P) can only propagate through 103 and 104 reaching the CK-inputs of the DFF's 88 and 89 at time (t8+8P+tpd2). At time (t8+8P+tpd2−tsu1), which is a setup time tsu1 before the clock pulse reaches the CK-inputs of the DFF's 88 and 89, the D-input of the DFF 88 is at logic high while the D-input of the DFF 89 is still at logic low so that 98, the Q-output of the DFF 88, switches from logic low to logic high on the arrival of the clock pulse to the CK-input while 99, the Q-output of the DFF 89, stays at logic low. Likewise, the logic high Q-output signal from the DFF 84, after propagating through the STDM 82 and the DOBM 93, reaches the D-input of the DFF 89 at time earlier than or at (t8+10P+tpd2−tsu1). An inversion of the logic high signal from the DFF 84 arrives at one of the inputs of 103, from the inversion output of 93, at time earlier than or at (t8+10P+tpd2−tsu1) as well. The clock pulse of the 'Stop Bit', which follows the fourth data cell, propagates through 104 reaching the CK-input of the DFF 89 at time (t8+10P+tpd2) in which the clock pulse edge triggers the D-input of the DFF 89 to be latched to 99, the Q-output of the DFF 89. The logic high Q-output from the DFF 84 eventually goes through STDM 83 and is inverted by 94 to be a logic low signal which reaches one of the inputs of 104 to block any later clock pulses.

As a result of this configuration and the signal code as mentioned above, the Q-outputs of the DFF's 85 through 89, i.e. 95 through 99, generate a parallel code, after the 'Stop Bit' arrives at the CK-input of 89, which is the result of the bit sequence of the incoming sequential signal code. A logic circuitry means can be set up to decode the parallel code such that an output from the logic circuitry will be '1' only when the incoming parallel code matches the predetermined format. The logic circuitry output '1' is then sent out to actuate the automobile starter system. As the case described earlier in the voltage window detection system, as shown in FIG. 3, the above logic circuitry means can contain an input, which is connected to the tachometer of the automobile, to disable the logic circuitry means from sending out the output '1' to actuate the automobile starter system if the automobile motor is running at a speed above a predetermined level.

We claim:

1. An electrical security system for an automobile comprising a DC-signal/sequential-code conversion means, which comprises a state initializaiton means, a self finite-clock-pulses generation means, and a signal code generation means for generating a sequential signal code, and a signal code detection means, which comprises a state initialization means, latch-type means, and signal time-delay means for detecting said sequential signal code, whereby said automobile can be started only as said sequential signal code generated by said DC-signal/sequential-code conversion means matches a predetermined code in said signal code detection means.

2. An electrical security system for an automobile as set forth in claim 1 wherein said state initialization means in said DC-signal/sequential-code conversion means comprises a plural-output buffer having at least one output port followed by a signal time-delay means.

3. An electrical security system for an automobile as set forth in claim 2 wherein said self finite-clock-pulses generation means comprises a self clock-pulses generation means and a clock-pulses blocking means whereby a continuous train of clock pulses generated by said self clock-pulses generation means are constrained by said clock-pulses blocking means into an arbitrarily predetermined finite number of clock pulses.

4. An electrical security system for an automobile as set forth in claim 1 wherein said self clock-pulses generation means comprises electrical logic-state transfer means and signal time-delay means in which one of the inputs of said electrical logic-state transfer means is connected to a DC signal while another input is connected to the output of said electrical logic-state transfer means through said signal time-delay means.

5. An electrical security system for an automobile as set forth in claim 1 wherein said signal time-delay means is installed on the feedback loop from said output of said electrical logic-state transfer means to said another input of said electrical logic-state transfer means.

6. An electrical security system for an automobile as set forth in claim 1 wherein a two-input XOR is used as said electrical logic-state transfer means having one input connected to a logic high DC signal and the other input connected to the XOR output through said signal time-delay means.

7. An electrical security system for an automobile as set forth in claim 1 wherein a two-input NAND is used as said electrical logic-state transfer means having one input connected to a logic high DC signal and the other input connected to the NAND output through said signal time-delay means.

8. An electrical security system for an automobile as set forth in claim 1 wherein said signal code detection means comprises latch-type means and a code setting means in which said code setting means has appropriate outputs connected to corresponding setting or resetting inputs of said latch-type means to set up a specific converting sequence or process.

9. A signal code detection means as set forth in claim 8 wherein D-type flip-flop's are used as said latch-type means.

10. A signal code detection means as set forth in claim 8 wherein said code setting means comprises a train of switches.

11. An electrical security system for an automobile as set forth in claim 1 wherein said DC-signal/sequential-code conversion means is made to be a portion of ignition switch.

12. An electrical security system for an automobile as set forth in claim 1 wherein said DC-signal/sequential-code conversion means is functional only when ignition switch is functional.

13. An electrical security system for an automobile having a signal code generation means for generating signal code and a signal code detection means for starting said automobile if said signal code from said signal code generation means matches a predetermined set of signal detection code in said signal code detection means comprising an electrical enable/disable means having an input connected to a transducer signal generation means generating transducer signals as indicators of automobile motor speed, said transducer signals being transmitted to said electrical enable/disable means thereof to disable said signal code detection means for preventing automobile motor from being started if said automobile motor is running at a speed above a preset limit.

* * * * *